United States Patent
Agha et al.

(10) Patent No.: US 6,688,826 B2
(45) Date of Patent: Feb. 10, 2004

(54) CAPTIVE FASTENER SYSTEM AND RETENTION MEMBER

(75) Inventors: Henna Agha, Hoffman Estates, IL (US); Glenn Heavens, Cheshire, CT (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 10/016,374

(22) Filed: Dec. 10, 2001

(65) Prior Publication Data

US 2003/0108401 A1 Jun. 12, 2003

(51) Int. Cl.[7] ................................. F16B 21/18
(52) U.S. Cl. .................... 411/352; 411/107; 411/999; 411/520
(58) Field of Search ................. 411/352, 353, 411/107, 516, 517, 520, 521, 525, 526, 999

(56) References Cited

U.S. PATENT DOCUMENTS

| | | | | |
|---|---|---|---|---|
| 2,658,248 A | * | 11/1953 | Kost | |
| 2,992,685 A | * | 7/1961 | Madsen | |
| 3,156,281 A | * | 11/1964 | Demi | |
| 3,226,145 A | * | 12/1965 | Goldberg | |
| 3,414,154 A | * | 12/1968 | Rose | |
| 4,222,310 A | * | 9/1980 | Garrett | |
| 4,306,708 A | * | 12/1981 | Gassaway | |
| 6,039,525 A | * | 3/2000 | Johnson | |
| 6,220,803 B1 | * | 4/2001 | Schellhase | |
| 6,309,157 B1 | * | 10/2001 | Amann | |
| 6,457,925 B1 | * | 10/2002 | Genick | |

* cited by examiner

Primary Examiner—Flemming Saether
(74) Attorney, Agent, or Firm—Mark W. Croll; Paul F. Donovan

(57) ABSTRACT

A captive fastener system having a fastener and a retention member is provided. The retention member includes a cylindrical body having a flange at one end thereof. Work piece retention members project outwardly of the body for securing the retention member in a bore of a work piece. A plurality of dimples project inwardly in the retention member, and are narrow in a circumferential direction and elongated in an axial direction of the body. The dimples frictionally engage a shank of the fastener, to hold the fastener in the retention member.

19 Claims, 2 Drawing Sheets

CAPTIVE FASTENER SYSTEM AND RETENTION MEMBER

CROSS REFERENCE TO RELATED APPLICATIONS

This application is related to U.S. application Ser. No. 09/593,654 entitled "Captive Fastener Member and System" filed on Jun. 13, 2000, and U.S. application Ser. No. 09/967,168 entitled "Captive Fastener Member and System" filed on Sep. 28, 2001.

FIELD OF THE INVENTION

The present invention generally relates to fastening systems, and, more particularly, to a pre-assembled fastening system having a fastener secured in a fastener retainer.

BACKGROUND OF THE INVENTION

In assembly processes, seemingly simple operations can have a significant impact on overall assembly process efficiency. Often, such operations are very repetitive, being performed at many stages of assembly.

One such operation is the simple act of attaching one work piece to another using a threaded fastener. In the simple form of such an assembly operation, a bolt or the like is inserted through a hole in a first work piece, and is engaged in threads in a hole of a second work piece. It is known to provide the fastener in a grommet-like device, that can be inserted and held in the hole of the first work piece. In this way, the work piece with fastener can be pre-assembled, and when joined with the second work piece during the assembly process, the fastener is already in place for attaching the first and second work pieces together.

Fasteners with fastener retainers, often referred to as captive fasteners, have taken on different forms, with differing results. U.S. Pat. No. 5,395,194 entitled "CONVOLUTED BOLT RETAINER", for example, discloses a polymer retainer having a thin wall body member comprising an alternate arrangement of ribs and ears about a central opening. The polymeric retainer is pre-assembled into a shaped bore in a structural member, and is retained therein by elastic deformation of the retainer walls. The elastic body member retains a bolt shaft disposed in the opening thereof, prior to mounting of the structural member on a mounting surface.

A disadvantage of this design, however, is that a special stepped bore is required in the structural member. As such, the retainer cannot be used with structures having conventional holes. An additional disadvantages is that fastener systems constructed in accordance with the design are not adequately retained in the structure, and can become dislodged during shipment.

Other captive fastening systems have fastener retention members that engage the threads of the fastener, such that the fastener must be more or less threaded into or out of the fastener retention member, to adjust the axial position of the fastener relative to the fastener retention member. This increases the time required to secure the fastener in the retention member, or to adjust the relative position of the fastener in the retention member.

It is desirable that the fastener retention member of a captive fastener system be securely retained in a hole of a work piece, without special shaping of the hole. It is further desirable that the fastener retention member grasp the fastener securely, at any position along the length of the fastener, whether at a threaded portion or at a smooth portion of the fastener shank, while still allowing axial adjustment of the fastener in the fastener retention member. Once seated in the hole, the fastener retention member should allow insertion or withdrawal of the fastener relative to the fastener retention member, without dislodging the fastener retention member. Further, it is desirable that the fastener retention members allow slight angular adjustment of the fastener within the hole in the work piece such that the captive fastener system compensates for slight misalignment between the first and second work pieces.

SUMMARY OF THE INVENTION

The present invention provides a captive fastening system in which a fastener is held in a fastener retention member by a plurality of inwardly directed elongated dimples that frictionally engage the outer surface of the fastener.

In one form thereof, the invention provides a captive fastener system, with a fastener including a head and a shank, and at least a portion of the shank having threads. A fastener retention member includes a cylindrical body having an axis and an axial opening therethrough. A flange is provided at one end of the cylindrical body extending radially outward from the axial opening. At least one work piece engagement member in the body is adapted and arranged to engage a bore in a work piece. A plurality of inwardly extending dimples is provided in the cylindrical body for frictionally engaging the fastener shank.

In another form thereof, the invention provides a fastener retention member with a cylindrical body having a first end and a second end, an axis and an axial opening therethrough between the first end and the second end. At least one inwardly extending, elongated dimple is provided in the body, the dimple being elongated generally in a direction between the first and second ends of the body.

In still another form thereof, the invention provides a fastener retention member with a substantially cylindrical body having a first end and a second end, and an axial opening between the first end and the second end. A flange extends outwardly of the body at one the end thereof. Pluralities of outwardly extending tabs are formed in the wall. A plurality of inwardly extending dimples is formed in the wall, each dimple being narrow in the circumferential direction of the cylindrical body and being elongated in the axial direction of the cylindrical body.

Other features and advantages of the invention will become apparent to those skilled in the art upon review of the following detailed description, claims and drawings in which like numerals are used to designate like features.

Figure 1:
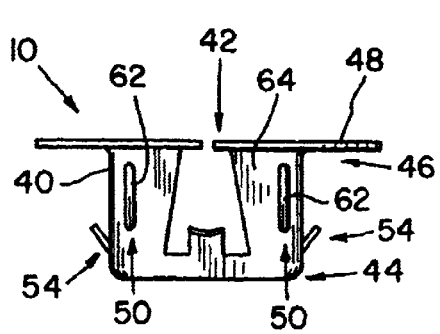
FIG. 1 is an elevational view of a fastener retention member for a captive fastener system of the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof.

DETAILED DESCRIPTION OF THE PREFERRED EMBODIMENT

Figure 3:
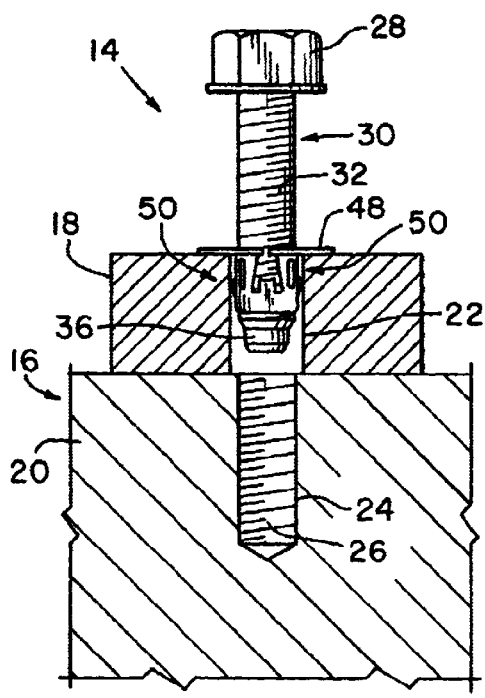
FIG. 3 is a side view of the captive fastener system of the present invention, prior to fastening work pieces together.
Figure 4:
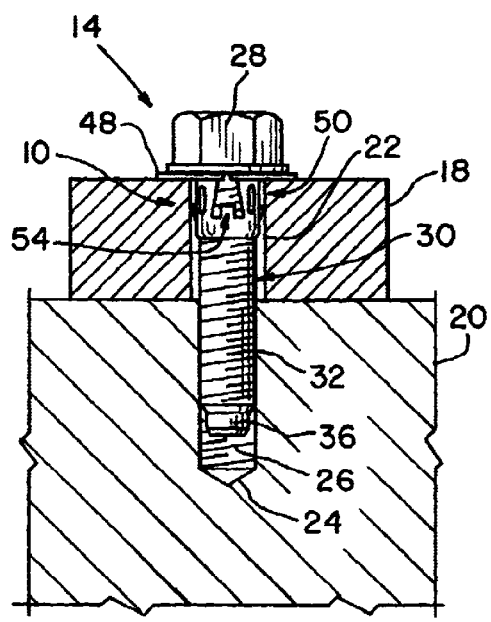
FIG. 4 is a side view similar to FIG. 3, but illustrating the work pieces fastened together.
Figure 5:
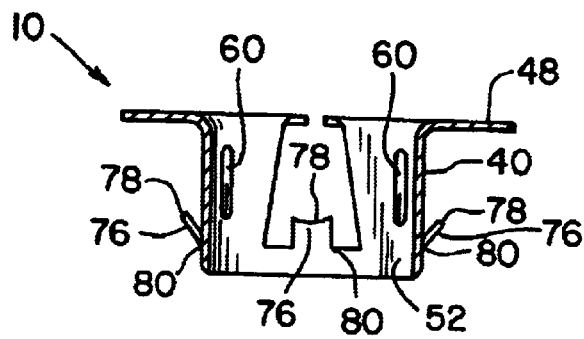
FIG. 5 is a cross-sectional view of the fastener retention member shown in FIG. 2, taken on line 5—5 of FIG. 2.

Referring now more specifically to the drawings, and to FIG. 1 in particular, a fastener retention member 10 according to the present invention is illustrated. Fastener retention member 10 is used with a fastener 12 in a captive fastener system 14 (FIGS. 3 & 4). Fastener system 14 is useful in completing an assembly 16, in which a first work piece 18 and a second work piece 20 are fastened together. First work piece 18 includes a bore 22 for receiving fastener retention member 10, and second work piece 20 includes a bore 24 having threads 26 therein. First work piece 18, for example, may be an oil pan, valve cover or the like, and second work piece 20 an engine block.

Figure 7:
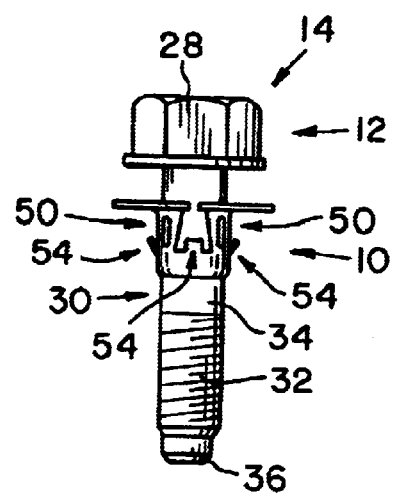
FIG. 7 is a side view of the captive fastener system of the present invention with a modified fastener.

Fastener 12 may be a bolt, screw or the like, and includes a head 28 and a shank 30. At least a portion of shank 30 includes threads 32, and, as illustrated in FIGS. 3 and 4, substantially the entire length of shank 30 may include threads 32. Alternatively, as illustrated in FIG. 7, a non-threaded portion 34 of shank 30 may be provided between head 28 and threads 32. Threads 32 of fastener 12 are adapted for engagement with threads 26 in bore 24. An entrance end 36 is provided on shank 30, opposite head 28, and may be variously shaped for positioning shank 30 in bore 24 for proper alignment and engagement of threads 32 with threads 26.

Figure 2:
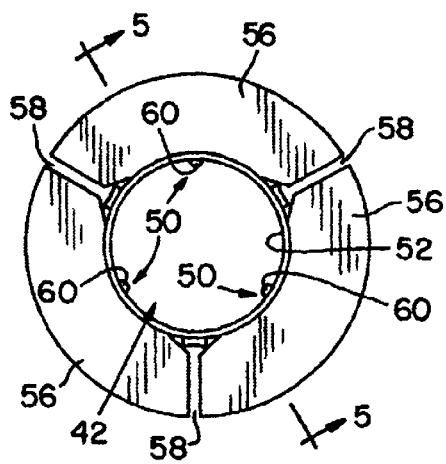
FIG. 2 is a top plan view of the fastener retention member shown in FIG. 1.

As illustrated in FIGS. 1 and 2, fastener retention member 10 includes a substantially cylindrical body 40 having an axial opening 42 extending therethrough, between a first end 44 and a second end 46 of cylindrical body 40. As used herein, "axial direction" shall refer generally to a direction between first end 44 and second end 46, and "circumferential direction" shall refer to a direction around body 40, substantially parallel to first and second ends 44 and 46. A flange 48 protrudes radially outwardly from one end of body 40, and is shown in the drawings at second end 46. At least one, and preferably a plurality of fastener engagement members 50 protrude inwardly from an inner surface 52 of body 40, and at least one, and preferably a plurality of work piece engagement members 54 extend outwardly of body 40.

Flange 48 may comprise an annular, plate-like member extending radially outwardly of body 40 or, as illustrated in FIG. 2, flange 48 may comprise a plurality of discrete segments 56 extending radially outwardly of body 40 and separated by spaces 58. The diameter of flange 48 is greater than the diameter of bore 22, such that flange 48 prevents fastener retention member 10 from entirely entering into bore 22. Preferably, flange 48 is sufficiently large so as to support fastener retention member 10 on first work piece 18, while allowing some limited axial shifting of body 40 in bore 22. Flange 48 also serves as a mounting surface for head 28 of fastener 12 in a similar nature to a washer.

Fastener engagement members 50 are dimples 60 directed inwardly in body 40, into axial opening 42. In the illustrated embodiment, dimples 60 are elongated ridges or creases formed in body 40, which occur as a slightly elevated land on inner surface 52, and may appear as a depression 62 in an outer surface of body 40. In the embodiment illustrated, three such dimples 60 are provided equally spaced about body 40; however, it should be readily understood that more or fewer dimples 60 can be used. Dimples 60 are provided to reduce the diameter of axial opening 42 and frictionally engage shank 30 of fastener 12 with sufficient resistance to adequately secure fastener 12 in body 40.

As illustrated in FIGS. 1–5, dimples 60 are narrow in the circumferential direction and elongated in the axial direction. Dimples 60 are substantially axially located on body 40, that is dimples 60 are substantially parallel to an axis of body 40 and substantially perpendicular to first and second ends 44 and 46. Each dimple 60 frictionally engages the outer edge of threads 32, with each dimple 60 extending along a substantial portion of the length of body 40, so as to frictionally engage several adjacent threads 32.

Figure 6:
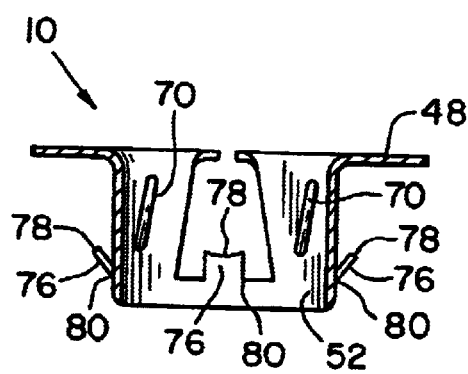
FIG. 6 is a cross-sectional view similar to FIG. 5, but illustrating a modified form of the fastener retention member.

In the modified embodiment illustrated in FIG. 6, dimples 70 are provided similar in shape to dimples 60. That is, each dimple 70 is narrow in the circumferential direction and elongated in the axial direction. However, dimples 70 are not oriented parallel to the axis of body 40, as are dimples 60. Instead, dimples 70 are disposed slightly skewed relative to the axis of body 40. Each dimple 70 also extends across several adjacent threads 32, but is not angled so extremely as to engage threads 32 in a threaded engagement manner.

Body 40, preferably, is metal, and dimples 60 or 70 can be formed by stamping or pressing processes, together with the formation of flange 48, as those skilled in the art will understand readily. Dimples 60 or 70 can be shaped differently from the narrow, elongated, ridge-like structures shown. For example, dimples 60 or 70 may be proportionately wider and/or shorter than as depicted in the drawings. However, the narrow, elongated, linear, ridge-like structures shown have been found to be advantageous for adequately securing fastener 12 in retention member 10, while still allowing the axial adjustment thereof as will be described hereinafter.

A particularly suitable work piece engagement member 54 is illustrated in the drawings, which includes a plurality, and as shown three resilient work piece engagement tabs 76 protruding outwardly from body 40. Each tab 76 is a segment cut in body 40, and has a distal end 78 which is bent or tilted outwardly from axial opening 42. Prior to insertion of fastener retention member 10 into bore 22, the diameter of fastener retention member 10 measured at the outer tips of distal ends 78 is greater than the diameter of bore 22. Distal end 78 comprises that portion of tab 76 closest to flange 48, and tab 76 is integral with body 40 at an end 80 of tab 76 opposite to distal end 78. Thus, body 40 can be inserted into bore 22 with minimal resistance, as tabs 76 are deflected inwardly. However, withdrawal of body 40 from bore 22 is inhibited by distal ends 78 of tabs 76 engaging with the wall of bore 22.

In the use of fastener system 14, in accordance with the present invention, fastener 12 and fastener retention member 10 may be pre-assembled before placement of fastener retention member 10 in bore 22 of first work piece 18. Alternatively, fastener retention member 10 may first be installed in bore 22 of first work piece 18, with fastener 12 subsequently inserted in fastener retention member 10.

Fastener retention member 10, with or without fastener 12 positioned therein, is inserted into bore 22, with first end 44 first entering bore 22. As tabs 76 encounter bore 22, the tabs are deflected inwardly, allowing body 40 to enter bore 22 until flange 48 is seated on work piece 18. Fastener retention member 10 is securely held in bore 22 by tabs 76, and specifically by distal ends 78 of tabs 76 engaging with bore 22. Distal ends 78 can be formed with points or an aggressive edge to partially embed in bore 22.

Fastener 12 is installed in fastener retention member 10 by inserting shank 30 in axial opening 42, entering at second end 46, through flange 48. Fastener 12 can be pushed to any desired depth of installation, and is retained at the desired position by frictional engagement of dimples 60 or 70 against shank 30, either across threads 32 or along non-threaded portion 34. Fastener 12 may be adjusted in axial position relative to fastener retention member 10. Dimples 60 or 70 frictionally engage threads 32 of shank 30, or non-threaded portion 34 of shank 30, with sufficient resistance to inhibit easy dislodgement of fastener 12. However, since dimples 60 or 70 frictionally engage the outer surface of shank 30, either at threads 32 or non-threaded portion 34, along discrete lines of contact, without engaging threads 32 in threaded fashion, fastener 12 can be pushed or pulled inwardly or outwardly relative to fastener retention member 10. Thus, axial movement of fastener 12 in fastener retention member 10 can be accomplished by applying sufficient axial force inwardly or outwardly on fastener 12, without requiring a rotational movement of fastener 12. In this manner, if need be, fastener 12 can be positioned at one axial position during shipment, and can be adjusted quickly and easily to another axial position prior to or during assembly of first and second work pieces 18 and 20.

When first work piece 18 and second work piece 20 are brought together during an assembly process, bores 22 and 24 are substantially aligned. Fastener 12 can be pushed along fastener retention member 10 until entrance end 36 of shank 30 enters bore 24. If bores 22 and 24 are not exactly in axial alignment, fastener retention member 10 can be shifted slightly in bore 22 until entrance end 36 is properly aligned to enter bore 24. Tabs 76 allow slight axial adjustment without releasing body 40 from bore 22. When properly aligned and positioned, fastener 12 is turned about its axis in normal threaded fastener manner, to secure together first work piece 18 and second work piece 20 in assembly 16.

If it becomes necessary to unsecure first work piece 18 from second work piece 20, fastener 12 is turned sufficiently to disengage threads 32 from threads 26. When completely disengaged from threads 26, fastener 12 may remain secured in retention member 10, and, if so, will not be lost or dropped as first work piece 18 is separated from second work piece 20.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A captive fastener system, comprising:
    a fastener including a head and a shank, at least a portion of said shank having threads; and
    a fastener retention member including:
        a cylindrical body having first and second ends and an axial opening between said first and second ends, said body having a circumferential direction around said body and an axial direction between said first and second ends;
        a flange at one end of said cylindrical body extending radially outward from said axial opening;
        at least one work piece engagement member adapted and arranged to engage a bore in a work piece; and
        a plurality of inwardly extending dimples being spaced from said first and second ends of said body and said dimples in said cylindrical body for frictionally engaging said fastener shank, said dimples being elongated in said axial direction of said body.

2. The fastener system of claim 1, said fastener retention member being metal.

3. The fastener system of claim 2, said elongated dimples extending in said axial direction substantially perpendicular to said first and second ends.

4. The fastener system of claim 2, said elongated dimples extending in said axial direction at a skewed angle.

5. The fastener system of claim 1, said threads extending the length of said shank.

6. The fastener system of claim 1, said shank including a non-threaded portion between said head and said threaded portion of said shank having threads.

7. The fastener system of claim 1, said annular body including tabs extending outwardly therefrom.

8. The fastener system of claim 7, said fastener retention member being metal.

9. The fastener system of claim 8, said elongated dimples extending in said axial direction substantially perpendicular to said first and second ends.

10. The fastener system of claim 8, said elongated dimples extending in said axial direction at a skewed angle.

11. The fastener system of claim 1, said plurality of dimples being three said dimples.

12. A fastener retention member comprising:
    a cylindrical body having a first end and a second end, an axis and an axial opening therethrough between said first end and said second end;
    at least one inwardly extending, elongated dimple in said body, said at least one dimple being elongated generally in a direction between spaced from said first and second ends of said body;
    an outwardly extending flange at one said end of said cylindrical body; and
    at least one work piece engagement member extending outwardly of said body, said at least one work piece engagement member including an outwardly extending tab formed in said body.

13. The fastner retention member of claim 12, said body having three said dimples.

14. The fastener retention member of claim 13, said elongated dimples extending axially in said body.

15. The fastener retention member of claim 13, said elongated dimples extending along said body at an angle relative to said body axis.

16. The fastener retention member of claim 12, said member being metal.

17. A fastener retention member comprising:
a substantially cylindrical body having a first end and a second end, and an axial opening between said first end and said second end, said body having a circumferential direction around said axial opening and an axial direction between said first and second ends;
a flange extending outwardly of said body at one said end thereof;
a plurality of outwardly extending tabs formed in said wall; and
a plurality of inwardly extending dimples formed in said wall, each said dimple being spaced from said first and second ends of said body, and each said dimple being narrow in said circumferential direction of said cylindrical body and being elongated in said axial direction of said cylindrical body.

18. The fastener retention member of claim 17, said dimples being substantially perpendicular to said ends.

19. The fastener retention member of claim 17, said dimples being disposed at a non-perpendicular angle relative to said ends.

* * * * *